(12) United States Patent
Schophuis

(10) Patent No.: US 9,103,744 B2
(45) Date of Patent: Aug. 11, 2015

(54) METHOD AND APPARATUS FOR REDUNDANT DETECTION OF A ROTATIONAL DIRECTION

(71) Applicant: epro Gmbh, Gronau (DE)

(72) Inventor: Ernst Schophuis, Ochtrup (DE)

(73) Assignee: epro Gmbh (DE)

( * ) Notice: Subject to any disclaimer, the term of this patent is extended or adjusted under 35 U.S.C. 154(b) by 207 days.

(21) Appl. No.: 13/946,110

(22) Filed: Jul. 19, 2013

(65) Prior Publication Data

US 2014/0020458 A1  Jan. 23, 2014

(51) Int. Cl.
 *G01C 21/00* (2006.01)
 *G01M 15/02* (2006.01)
 *G01P 13/04* (2006.01)
 *G01P 21/02* (2006.01)
 *F01D 1/00* (2006.01)

(52) U.S. Cl.
 CPC ............. *G01M 15/02* (2013.01); *G01P 13/045* (2013.01); *G01P 21/02* (2013.01); *F01D 1/00* (2013.01)

(58) Field of Classification Search
 None
 See application file for complete search history.

(56) References Cited

U.S. PATENT DOCUMENTS

| | | | | |
|---|---|---|---|---|
| 5,446,376 | A * | 8/1995 | Porter et al. | 324/165 |
| 6,662,095 | B1 * | 12/2003 | Habeck | 701/51 |
| 8,050,832 | B2 * | 11/2011 | Fuhrer et al. | 701/54 |
| 2009/0021243 | A1 * | 1/2009 | Schunk | 324/173 |
| 2009/0280948 | A1 * | 11/2009 | Fuhrer et al. | 475/331 |

* cited by examiner

*Primary Examiner* — Andre Allen
(74) *Attorney, Agent, or Firm* — Luedeka Neely Group, P.C.

(57) ABSTRACT

Redundant detection of a rotational direction of a body having a rotary axis, in particular of a drive shaft of a turbine, is performed using at least one evaluation unit designed for evaluating at least three signals from three sensors arranged offset around the rotary axis. One period of a flank signal of a signal used as the primary signal is evaluated with the applied signal of one (Digital2) of the two signals not used as the primary signal for detecting the rotational direction. An error detection unit is designed for detecting the number of flanks of the signal initially used for detecting the rotational direction during the period. In the event of an error detection, the further rotational direction is detected in the evaluation unit on the basis of the other (Digital3) of the two signals.

18 Claims, 6 Drawing Sheets

METHOD AND APPARATUS FOR REDUNDANT DETECTION OF A ROTATIONAL DIRECTION

FIELD

The present invention concerns a method for redundant detection of a rotational direction.

BACKGROUND

The arrangement of three double sensors around the rotary axis of a rotating body, for example a drive shaft of a turbine, is known in the prior art. The rotational direction is determined by means of an evaluation unit using the sensor signal from the two sensors of a double sensor, in particular making use of the flank patterns. The three rotational directions are then compared to one another in an evaluation unit, and when two rotational directions accord with one another these are output as the correct rotational direction. The use of this rule, known as "2 out of 3", is important when safety and availability requirements are high. If one of the sensors fails, two double sensors remain, on the basis of which the rotational direction can still be redundantly determined. Due to the high safety requirements of power station construction, redundancy is necessary. However, the use of three double sensors is on the one hand expensive, due to the use of a total of six sensors, while on the other hand, due to the amount of room available for installation, problems are involved in the arrangement of these relatively high-volume sensors.

SUMMARY

Some embodiments of the present invention provide a method or a device for detection of rotational direction in such a way that it can be provided more economically and that its use, in the case of less space for installation, nevertheless features high availability.

In some embodiments, a method is provided for redundant detection of a rotational direction of a body with a rotary axis, in particular a drive shaft of a turbine, with an evaluation unit in the form of a circuit arrangement, wherein the evaluation unit is constructed for evaluating signals of three sensors, constructed in particular as simple sensors, arranged offset around the rotary axis, wherein in one period a flank signal of a signal used as a primary signal is evaluated with the (preferably simultaneously) available signal of one of the two signals not being used as the primary signal for detection of the rotational direction, wherein an error detection unit is constructed for detection of the number of flanks of the signal initially used for detection of the rotational direction during the period and, in the event of an error detection, the further detection of the rotational direction in the evaluation unit is carried out on the basis of the other one of the two signals.

As the term is used herein, a "flank" of a signal is a leading edge or trailing edge of the signal in the time domain as the signal transitions between high and low states. Examples of leading edge flanks are depicted in FIG. 6 (reference numbers 35).

A period is here preferably formed for the primary signal by the distance between two flanks with a slope having the same arithmetical sign. The detection of the rotational direction in a period is preferably performed at the time of a flank of the primary signal provided with a positive or negative slope with evaluation of the amplitude of the other signals under observation simultaneously or at a linked time.

Instead of the use of three double sensors, which are of correspondingly high-volume, embodiments of the invention require or process the signals of only three single or simple sensors, wherein circuitry ensures that in the event of the failure of a signal of a sensor, at least two redundant measurements continue to be present. The availability of the measurement of the system is identical to that of systems that use three double sensors, while the space required for installation and the costs are, however, lower or smaller.

Preferably the evaluation unit comprises three separate evaluation circuits for detection of the rotational direction, each comprising three signal inputs for signals originating from the sensors, and to which one sensor can be assigned as primary, wherein for a normal state, a first evaluation circuit evaluates the signals of the first and second signal inputs, a second evaluation circuit evaluates the signals of the second and third sensors, and the third evaluation circuit evaluates the signals of the third and first sensors. While, on the one hand, the connection of three sensor or signal inputs permits redundancy of the detection of the rotational direction, the evaluation circuits too, referred to below as "monitors", are also designed redundantly. Each evaluation circuit can thus, on the basis of the three signal inputs used, continue to output a correct rotational direction in the presence of an error in one of the signals applied to a signal input through switching over to a detection of the rotational direction using the remaining inputs.

In some embodiments, the signals to be used at the signal inputs are designed in such a way that through the interaction of an associated trigger wheel, which can also be fastened to the rotating body or which can directly be integrated into the body, with a respective sensor a pulse-pause ratio in the range of 50:50 is generated in the signal, i.e. of up to +/−10%.

In a further advantageous embodiment, the rotational direction is formed in an evaluation circuit even during one period on the basis of the signals of a first sensor input, the primary sensor input, in relation to both the first other sensor and the second other sensor and is placed in a memory, so that in the event of an error detection in one sensor, a signal from the other detection is already present. Of the two rotational directions determined, however, preferably only one is output and, after detection of an error in a signal used to determine the rotational direction that is output, the rotational direction derived from the other one of the two signals with the primary signal is output.

As an alternative it is possible, after the detection of an error in one of two additional signals (not originating from the primary sensor), for the evaluation circuit using this signal for detection of the rotational direction to be switched over to the signal line that has not until this time been used for detection of the rotational direction. In comparison with the previous possibility, this reduces the amount of computation required, although the rotational direction can then only be made available in a further cycle, and therefore with some delay. This is in particular disadvantageous in comparison with the previously described alternative in the context of specified times within which the detection of the rotational direction is to take place.

Due to the circuit arrangement therefore, two rotational directions, which in the ideal case are identical, are preferably determined in each evaluation circuit or monitor during one cycle. Thus even in the event of the failure of two evaluation circuits or of the failure of one evaluation circuit and one sensor, it still remains possible to evaluate and provide two rotational directions. In order to apply the "2 out of 3" rule described above in the evaluation unit, it is sufficient for one rotational direction to be output by each monitor. The design of the system according to some embodiments is thus more secure against failure than the devices or methods known in the prior art.

Preferably three error detection circuits each associated with one evaluation circuit, are present for error detection, so that correct error detection still occurs even in the event of failure of one sensor and two evaluation circuits. In particular, the evaluation unit can also comprise error detection for the primary signal following the detection of the rotational speed.

In some embodiments, the evaluation circuit comprises a memory for the rotational direction signal, and, after a last period, outputs the rotational direction signal from the period before last, wherein the case of an error occurring during the last or last-but-one period, this rotational direction signal is a rotational direction signal developed from the signals that are not erroneous. In this way a correct rotational direction signal is output without time delay even when an error is detected in the same cycle, without this resulting in a relevant time delay. Preferably the data values that are necessary for this are stored in a shift register, through which the values can then be shifted in each cycle, and which can be accessed without any difficulty.

The number of flanks of a signal during a period is preferably used for error detection. In particular, a simple evaluation of a rotational direction signal is possible when an error is identified in that a number of flanks with a slope having the same arithmetical sign of a signal during one period is unequal to 1. An error can thus then be present if the signal channel under observation, or the associated signal line, or the signal itself, either does not change during one period or changes too frequently.

A reliable detection of the rotational direction is moreover achieved if a period of the primary signal is formed by the distance between two flanks with a slope having the same arithmetical sign. The signals here are, for example, sensor signals originating with the passage of teeth of a trigger wheel past the sensor(s) arranged offset around this trigger wheel.

Preferably the rotational direction is formed through the analysis of the primary signal with the amplitude of the further signal that is above or below a threshold or a threshold range. Accordingly both analog and digital signals, i.e. in particular voltage curves at the signal input, can be used for detection of the rotational direction. In particular, in the analysis of the primary signal, the flank curve of the signal is examined to see if it is above or below a threshold or a threshold range.

A microprocessor-supported signal evaluation is in particular appropriate if the signals are digitally processed, and in particular are present in digital form. For this purpose, the signal input can be provided with a threshold filter which, above or below an upper or lower threshold and thus a threshold range, outputs, for example, a high or a low signal. Circuitry can present the flank at the transition across the threshold range or an individual threshold as a rectangular flank, and analyze it correspondingly in the evaluation.

Some embodiments provide a device that comprises three sensors and an evaluation unit and which is characterized in that it is constructed for performing a method as described above or below. The device according to these embodiments comprises at least three evaluation circuits that can be each assigned to one sensor, wherein the evaluation circuits are constructed to output a rotational direction signal, and comprise signal inputs for all the sensors, and wherein, in the event of a failure of a sensor, whose signal is being used with a signal of another sensor to detect the rotational direction, the signal of the third sensor is used for detection of the rotational direction. Circuitry connects each evaluation circuit with all three sensors.

Preferably an error detection circuit is assigned to each evaluation circuit, wherein the evaluation unit can consist, for example, of three separate functional units that can be mounted on a rack, each having its own connections for all three sensors to be used, or which in general can have three signal inputs.

BRIEF DESCRIPTION OF THE DRAWINGS

Further advantages and details of the invention are to be found in the following description of the figures, wherein elements are not to scale so as to more clearly show the details, wherein like reference numbers indicate like elements throughout the several views, and wherein.

Parts that are identical or that work in similar ways are—whenever useful—given identical reference numbers. Individual technical features of the exemplary embodiments described below can also lead, with the characteristics of the embodiments described above, to developments according to the invention.

DETAILED DESCRIPTION

Figure 1:
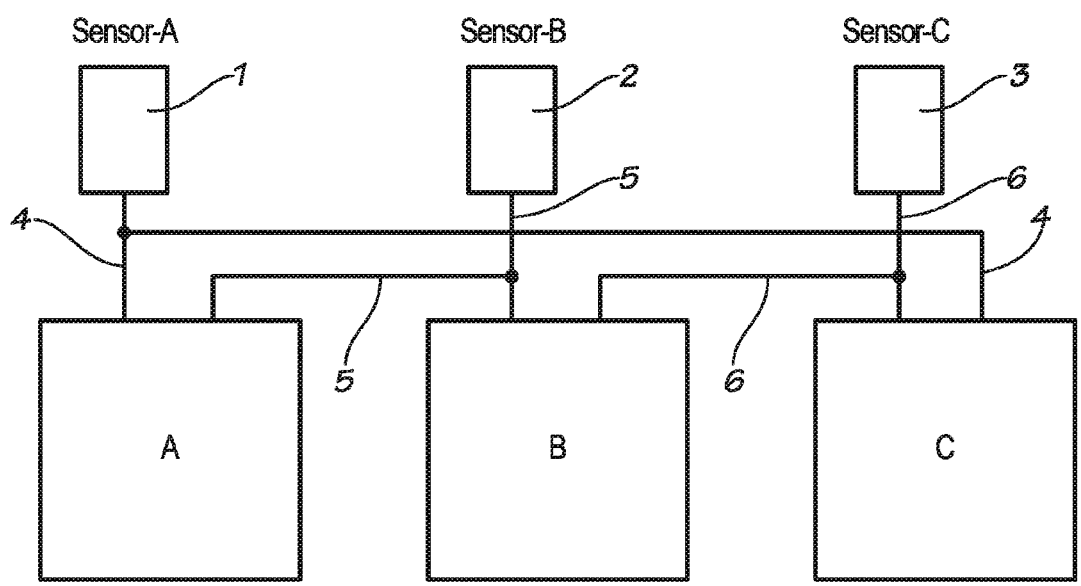
FIG. 1 depicts a circuit of a device according to an exemplary embodiment of the invention.

An embodiment of a device for performing a method according to the invention is illustrated in FIG. 1. This is a simplified representation, merely illustrating the fundamental principle. The device comprises three sensors 1, 2 and 3. These sensors are, for example, arranged offset in the circumferential direction around a trigger wheel in such a way that the flanks of the same slope from the three sensors occur within one period P (cf. FIG. 6) of the primary sensor. Preferably the flank signals are offset by 120 degrees with respect to a 360 degree period.

The signal lines of at least two of the three sensors are assigned to each of the three monitors or the three evaluation circuits A, B, C. Monitor A is connected through a line 4 to sensor 1, through a line 5 to sensor 2, monitor B is also connected by means of the line 5 to the sensor 2 and through a line 6 to the sensor 3, monitor C is connected through the line 6 to the sensor 3 and through the line 4 to the sensor 1. Thus monitor A is primarily constructed for detection of the rotational direction on the basis of the signals from sensors 1 and 2, monitor B is primarily constructed for detection of the rotational direction on the basis of sensors 2 and 3, and monitor C is primarily constructed for detection of the rotational direction on the basis of sensors 3 and 1.

Figure 2:
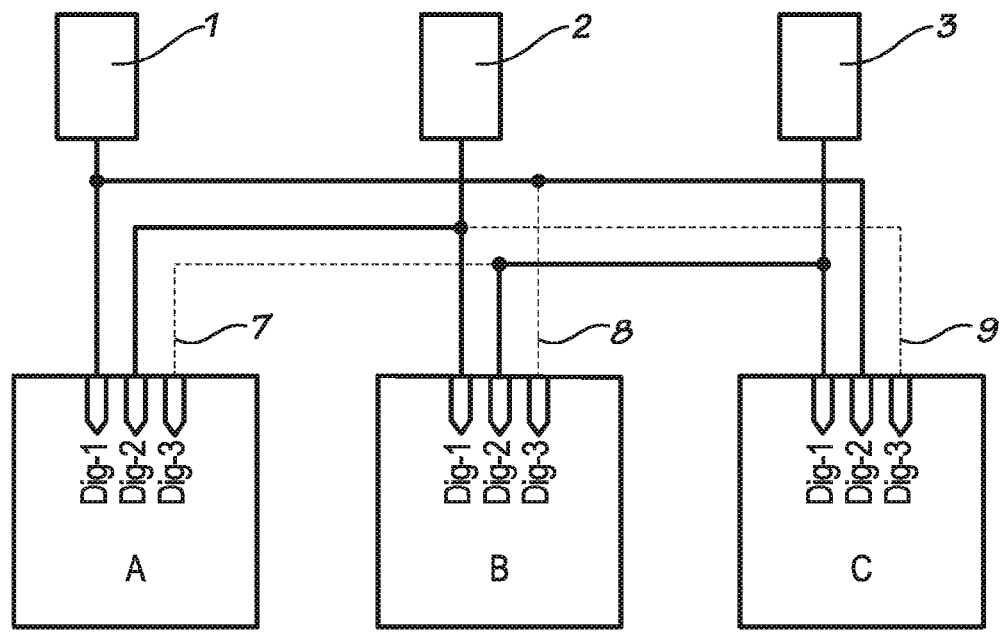
FIG. 2 depicts a more precise illustration of an object according to FIG. 1.

Three rotational directions are, accordingly, already detected. The redundant design of the system is made clear on the basis of FIG. 2. According to this, each monitor A, B, C has digital inputs Dig-1, Dig-2, and Dig-3, each of which is connected to one of the sensors 1, 2 or 3.

A signal line 7 shown as a dotted line connects the input labeled Dig-3 of the evaluation circuit A to the sensor 3, a signal line 8 connects the monitor B to the sensor 1, and a signal line 9 connects the monitor C to the sensor 2.

Figure 3:
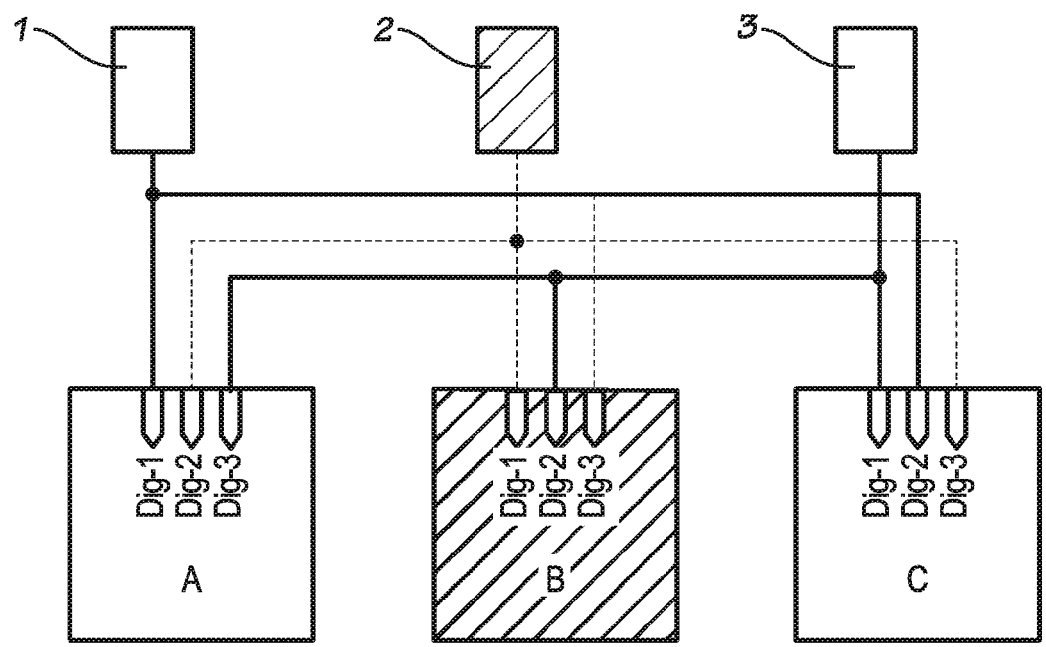
FIG. 3 depicts the object of FIG. 2 in the presence of an error.

In the event of an error in which the sensor 2 (see FIG. 3) fails, the evaluation circuit A ignores the signal from the sensor 2 that is applied to the signal input Dig-2. Instead, the signal is now determined on the basis of the sensors 1 and 3, and therefore through the signal inputs Dig-1 and Dig-3. Correspondingly the signal is also determined on the basis of the sensors 1 and 3 in the evaluation circuit C. In the present case, the monitor B is considered erroneous, and is no longer used for detection of the rotational direction. Two detections of the rotational direction can thus still be made even when one of the three sensors fails.

Figure 4:
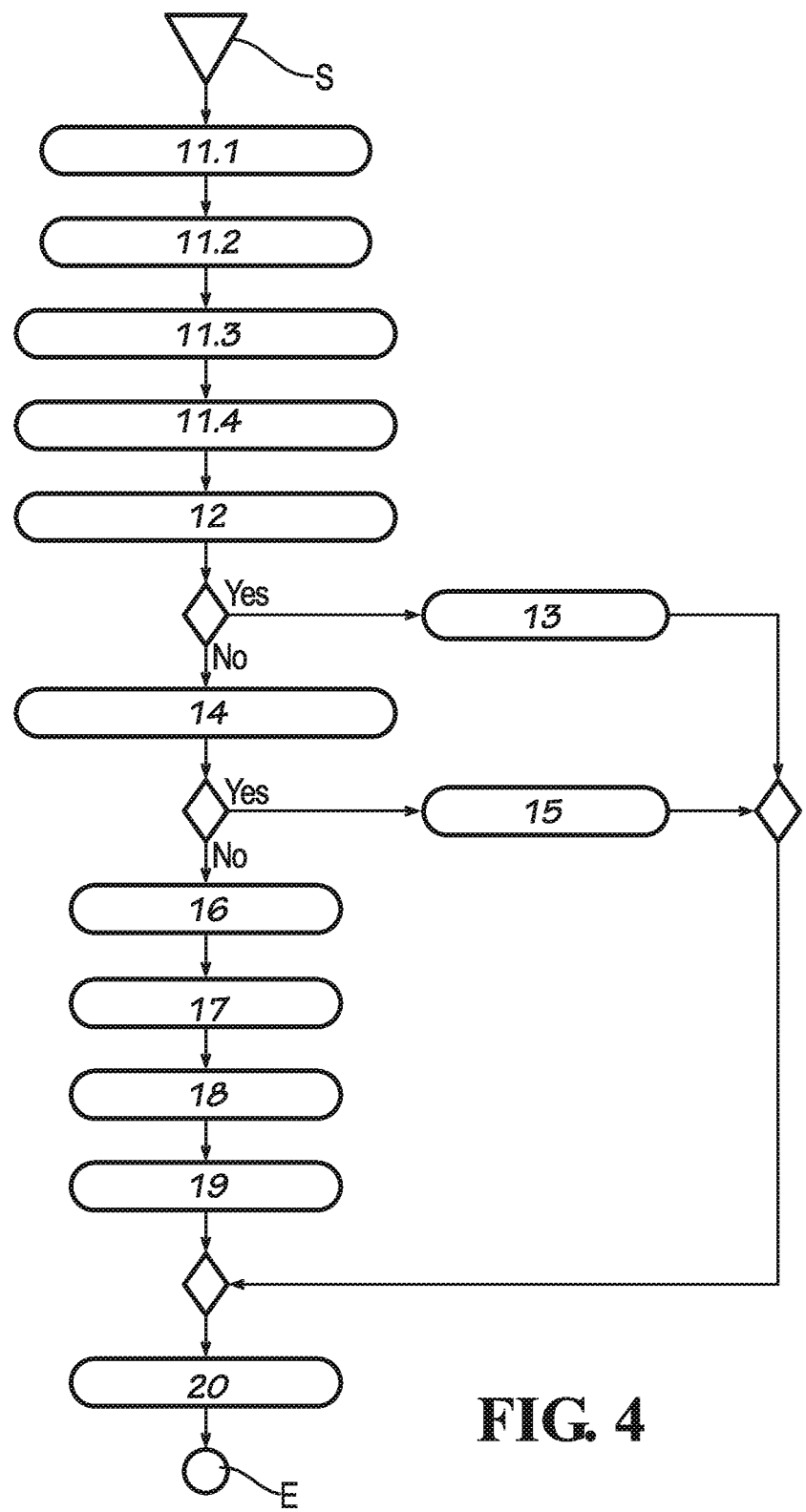
FIG. 4 depicts a flow diagram of an exemplary embodiment according to the invention.

In the flow diagram of FIG. 4, an exemplary embodiment operating sequentially is explained in more detail. Beginning from a starting time S which can, for example, be given by a positive or negative slope of a flank of the signal selected as the primary signal from a sensor identified, for example, as sensor 1, the results of a foregoing period are initially offset in the shift register by a memory in the steps 11.1, 11.2, 11.3 and 11.4. Thus at point 11.1, an error signal Puls2 is moved one register on in just the same way as is done for the error signal Puls3. After this, the memory of the shift register that has now become free has the new error signal values for the sensors 2 and 3 written into it (11.2). At 11.3 and at 11.4, the old rotational directions derived therefrom, or the new rotational directions, are also correspondingly placed into the associated memory of the shift register.

Following this, at point 12, the question of whether the new or old signal input from sensor 2 has supplied precisely one pulse is queried. In the event that the answer is yes, no error is detected, and the rotational direction corresponds to the old rotational direction (which is correspondingly stored in step 13). If, however, the query under step 12 has to be answered with no, then a further query is made under point 14 as to whether the signal sequence at the input Dig-3 of the monitor A was correct, which means in particular whether the number of flanks in one period was exactly equal to 1. If this is confirmed, a changeover is made to outputting a detection of the rotational direction derived from the sensors 1 and 3 (step 15). In these cases, the correct rotational direction is output under 20. Otherwise, in the steps 16, 17, 18 and 19 the individual parameters of the circuit are again set to zero, and an error is output. At the end point E the sequential procedure is now finished.

Figure 5:
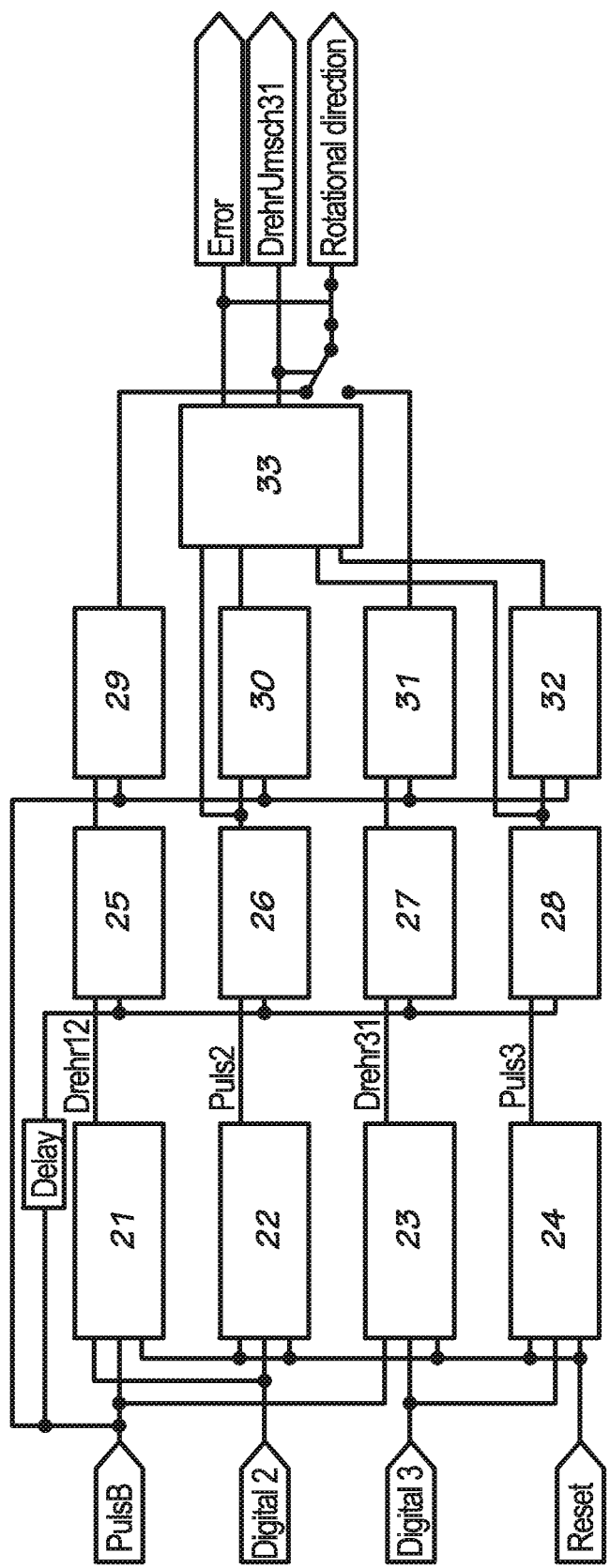
FIG. 5 depicts a block diagram of a further exemplary embodiment according to the invention.

A further exemplary embodiment can be seen in FIG. 5. A block circuit diagram shown there illustrates the parallel detection of two rotational directions in an evaluation circuit A obtained from altogether three sensors.

At first, a pulse signal PulsB at the input Dig-1 of the monitor A is used with a pulse signal Digital2 at the input Dig-2 of the same monitor in the block 21 in order to detect a detection of the rotational direction Drehr12. In parallel, in the block 22, a check is made as to whether pulse errors, i.e. an erroneous signal, are present. The result is then output as Puls2 (high/low). In a similar way, the signal Digital3 with the input signal at the input Dig-3 is used together with the (primary) signal PulsB for detection of the rotational direction in the block 23. In the block 24, a query is again made in parallel thereto as to whether less than or more than precisely one flank has been present in the pulse signal within one period, meaning that the sensor signal, or the sensor 3, is erroneous. The result is output as Puls3 (high/low). The results from the evaluation circuits 21, 22, 23 and 24 are saved in associated memories 25, 26, 27 and 28. The circuits 21 to 24 are then reset by means of a reset input, or alternatively by a delay from PulsB.

In the following period, the state from the memories 25 to 28 of the shift register is initially taken over in the second memory level of the shift register by memories 29, 30, 31 and 32. In addition, new pulse information or signals in the input circuit is/are evaluated, and the results are buffered again in the memories 25 to 28.

The evaluation logic 33 checks whether errors are present in the error detection circuits 22 and 24 during the period that is then current or have been present in the previous period. If both rotational direction signals Drehr12 and Drehr31 are indicated as erroneous, an error is output. Alternatively, depending on the result of the error monitoring, the selection of the rotational direction channel or of the rotational direction is output, as also is an indication as to whether a changeover in the rotational direction has taken place and thus that an error has been present in the rotational direction signal Drehr12.

For the case that an error is detected during the last period, in which the second memory level 25 to 28 was occupied, but which, however, is not present in both sensors but only in one of the two sensors, then it is possible to switch over directly to the signal that does not originate from the erroneous sensor. For this purpose it is also still possible to refer back to the signal of the period before last, which is still stored in the second memory layer in the memories 31 or 29. The rotational direction is accordingly output correctly, even when there is an error in one sensor signal, on the basis of the two other correct sensor signals.

Figure 6:
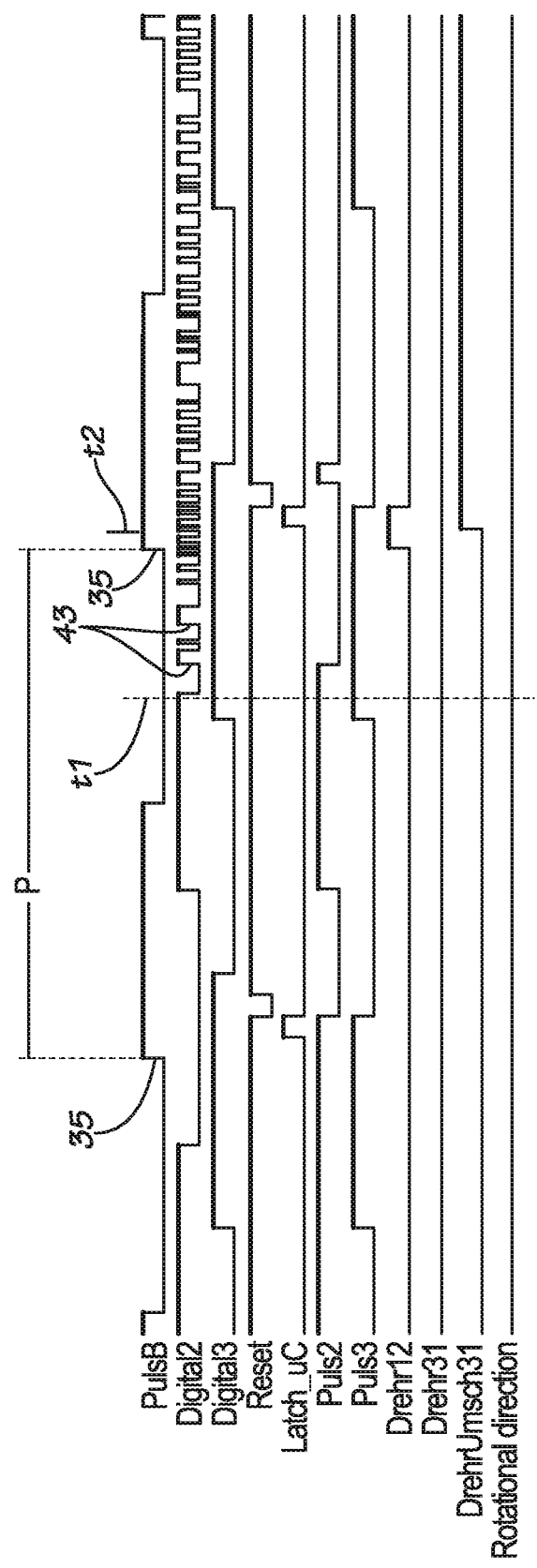
FIG. 6 depicts signal sequences of an object according to FIG. 5.

In the pulse or signal diagram of FIG. 6 the individual "high" and "low" voltage states of the individual switching elements of the device according to the invention, or occurring during the performance of a method according to the invention, can be seen. Two flanks 35 of the same slope represent one period P of the primary signal PulsB. Time is represented here in the x-direction, while the individual memory states or signals in the circuit are respectively represented on the line for each signal (PulsB, Digital 2, Digital 3, Reset etc.). A rotational direction Drehr12 is defined based on the memory state or the signal of Digital2 during the flank 35 at the beginning of the period P. In parallel with this (or, in other exemplary embodiments, offset from this), an identical rotational direction Drehr31 is determined from the comparison of the signals PulsB and Digital3. A reset signal follows this, which returns the input circuits to zero again. The rotational direction Drehr12 and the rotational direction Drehr31 are identically given a "low signal". There is no changeover in the rotational direction, and a corresponding rotational direction is output (the "rotational direction" line). At a time t1, the associated sensor 2 fails as can be detected from the presence of more than one flank 43 pointing in the same direction within the period of PulsB.

Because an error is now indicated during the rising flank of PulsB in the second period Puls2 and the rotational direction Drehr12 changes at the same time from "low" to "high", a changeover is made by means of the changeover signal DrehrUmsch31. The detection of the rotational direction now delivers the rotational direction signal Drehr31 as the rotational direction. The rotational direction that is output is thus identical to what it was before. This changeover is done at a time t2.

Figure 7:
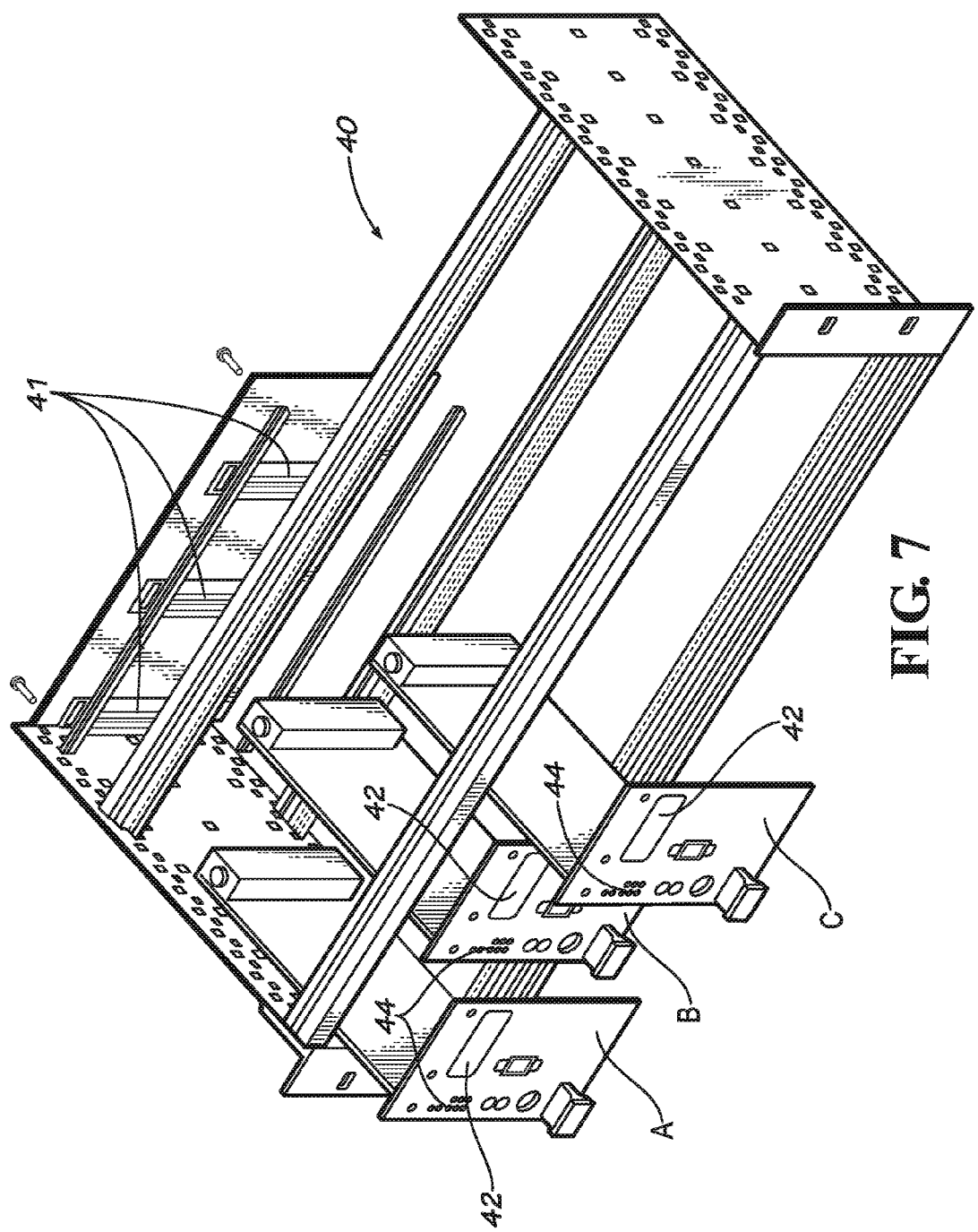
FIG. 7 depicts an exemplary embodiment according to the invention.

A device according to an embodiment of the invention is partially illustrated in FIG. 7. Three slots are there occupied by the evaluation circuits A, B and C in an evaluation unit 40.

Each evaluation circuit is assigned on the backplane to a sensor connection 41. Status diodes 44 on their front faces indicate various system states. The connections correspond to the signal inputs Dig-1, Dig-2 and Dig-3. Each evaluation unit A, B, C moreover has a display 42 through which the results of the detection of the rotational speed are output.

The invention claimed is:

1. A method for redundant detection of a rotational direction of a body having a rotary axis, the method comprising:
   (a) generating at least three sensor signals using at least three sensors arranged offset around the rotary axis;
   (b) at a first time during a rotational period of the body, comparing a first sensor signal of the at least three sensor signals with a second sensor signal of the at least three sensor signals;
   (c) determining the rotational direction of the body based on comparing the first sensor signal with the second sensor signal;
   (d) determining a number of flanks of the second sensor signal that occur during one rotational period of the first sensor signal; and
   (e) if the number of flanks of the second sensor signal indicate an error in the second sensor signal, determining the rotational direction of the body based on comparing the first sensor signal with a third sensor signal of the at least three sensor signals.

2. The method of claim 1 further comprising:
   (f) determining a number of flanks of the third sensor signal that occur during one rotational period of the first sensor signal; and
   (g) if the number of flanks of the third sensor signal indicate an error in the third sensor signal, determining the rotational direction of the body based on comparing the first sensor signal with the second sensor signal.

3. The method of claim 1 further comprising:
   (f) determining a number of flanks of the third sensor signal that occur during one rotational period of the first sensor signal; and
   (g) generating an error signal when the number of flanks of the second sensor signal indicate an error in the second sensor signal and the number of flanks of the third sensor signal indicate an error in the third sensor signal.

4. The method of claim 1 further comprising:
   (f) if the number of flanks of the second sensor signal indicate no error in the second sensor signal, outputting the rotational direction of the body determined in step (c) to a display device.

5. The method of claim 2 further comprising:
   (h) if the number of flanks of the third sensor signal indicate no error in the third sensor signal, outputting the rotational direction of the body determined in step (e) to a display device.

6. The method of claim 1 wherein an error is indicated in the second sensor signal if the number of flanks of the second sensor signal determined in step (d) is not equal to one.

7. The method of claim 2 wherein an error is indicated in the third sensor signal if the number of flanks of the third sensor signal determined in step (f) is not equal to one.

8. The method of claim 1, wherein an error is indicated in a sensor signal if a number of flanks of the sensor signal with a slope having the same arithmetical sign during one rotational period of the body is not equal to one.

9. The method of claim 1, wherein one rotational period of the first sensor signal is determined by a distance between two flanks of the first sensor signal with slopes having the same arithmetical sign.

10. The method of claim 1, wherein step (b) comprises determining whether an amplitude of the second sensor signal is above or below a threshold or is within a threshold range at the first time.

11. A apparatus for detecting a rotational direction of a body having a rotary axis, the apparatus comprising:
   at least three sensors arranged offset around the rotary axis of the body, the at least three sensors including a first sensor generating a first sensor signal, a second sensor generating a second sensor signal, and a third sensor generating a third sensor signal; and
   an evaluation unit for outputting a rotational direction signal indicating the rotational direction of the body, which is determined based on at least two of the first, second and third sensor signals, the evaluation unit comprising:
      a first evaluation circuit having at least three signal inputs for receiving the first, second and third sensor signals, the first evaluation circuit outputting a rotational direction signal based on comparing the first sensor signal to the second sensor signal when the second sensor is functional, the first evaluation circuit outputting a rotational direction signal based on comparing the first sensor signal to the third sensor signal in the event of a failure of the second sensor;
      a second evaluation circuit having at least three signal inputs for receiving the first, second and third sensor signals, the second evaluation circuit outputting a rotational direction signal based on comparing the second sensor signal to the third sensor signal when the third sensor is functional, the second evaluation circuit outputting a rotational direction signal based on comparing the second sensor signal to the first sensor signal in the event of a failure of the third sensor; and
      a third evaluation circuit having at least three signal inputs for receiving the first, second and third sensor signals, the third evaluation circuit outputting a rotational direction signal based on comparing the third sensor signal to the first sensor signal when the first sensor is functional, the third evaluation circuit outputting a rotational direction signal based on comparing the third sensor signal to the second sensor signal in the event of a failure of the first sensor.

12. The apparatus of claim 11, wherein
   the first evaluation circuit comprises:
      a first error detection circuit that generates an error signal when a number of flanks of the second sensor signal detected during one rotational period of the first sensor signal is not equal to one; and
      a second error detection circuit that generates an error signal when a number of flanks of the third sensor signal detected during one rotational period of the first sensor signal is not equal to one;
   the second evaluation circuit comprises:
      a third error detection circuit that generates an error signal when a number of flanks of the third sensor signal detected during one rotational period of the second sensor signal is not equal to one; and
      a fourth error detection circuit that generates an error signal when a number of flanks of the first sensor signal detected during one rotational period of the second sensor signal is not equal to one; and
   the third evaluation circuit comprises:
      a fifth error detection circuit that generates an error signal when a number of flanks of the first sensor signal detected during one rotational period of the third sensor signal is not equal to one; and a sixth error detection circuit that generates an error signal when a number of flanks of the second sensor signal detected during one rotational period of the third sensor signal is not equal to one.

13. The apparatus of claim 12, wherein
the first evaluation circuit outputs a rotational direction signal based on comparing the first sensor signal to the third sensor signal when the first error detection circuit generates an error signal and the second error detection circuit does not generate an error signal;
the second evaluation circuit outputs a rotational direction signal based on comparing the second sensor signal to the first sensor signal when the third error detection circuit generates an error signal and the fourth error detection circuit does not generate an error signal; and
the third evaluation circuit outputs a rotational direction signal based on comparing the third sensor signal to the second sensor signal when the fifth error detection circuit generates an error signal and the sixth error detection circuit does not generate an error signal.

14. The apparatus of claim 12, wherein,
the first evaluation circuit further comprises first evaluation logic that receives signals generated by the first and second error detection circuits and generates an error signal when both the first and second error detection circuits generate error signals;
the second evaluation circuit further comprises second evaluation logic that receives signals generated by the third and fourth error detection circuits and generates an error signal when both the third and fourth error detection circuits generate error signals; and
the third evaluation circuit further comprises third evaluation logic that receives signals generated by the fifth and sixth error detection circuits and generates an error signal when both the fifth and sixth error detection circuits generate error signals.

15. The apparatus of claim 11, wherein
the first evaluation circuit comprises:
    a first rotational direction detection circuit that generates a rotational direction signal based on comparing the first sensor signal to the second sensor signal; and
    a second rotational direction detection circuit that generates a rotational direction signal based on comparing the first sensor signal to the third sensor signal;
the second evaluation circuit comprises:
    a third rotational direction detection circuit that generates a rotational direction signal based on comparing the second sensor signal to the third sensor signal; and
    a fourth rotational direction detection circuit that generates a rotational direction signal based on comparing the second sensor signal to the first sensor signal; and
the third evaluation circuit comprises:
    a fifth rotational direction detection circuit that generates a rotational direction signal based on comparing the third sensor signal to the first sensor signal; and
    a sixth rotational direction detection circuit that generates a rotational direction signal based on comparing the third sensor signal to the second sensor signal.

16. The apparatus of claim 15, wherein
the first evaluation circuit comprises a first memory that receives the rotational direction signals from the first and second rotational direction detection circuits for a last rotational period and a next-to-last rotational period, wherein after the last rotational period, the first evaluation circuit outputs a rotational direction signal that was determined based on non-erroneous sensor signals and that was stored in the first memory during the next-to-last rotational period;
the second evaluation circuit comprises a second memory that receives the rotational direction signals from the third and fourth rotational direction detection circuits for a last rotational period and a next-to-last rotational period, wherein after the last rotational period, the second evaluation circuit outputs a rotational direction signal that was determined based on non-erroneous sensor signals and that was stored in the second memory during the next-to-last rotational period; and
the third evaluation circuit comprises a third memory that receives the rotational direction signals from the fifth and sixth rotational direction detection circuits for a last rotational period and a next-to-last rotational period, wherein after the last rotational period, the third evaluation circuit outputs a rotational direction signal that was determined based on non-erroneous sensor signals and that was stored in the third memory during the next-to-last rotational period.

17. An apparatus for detecting a rotational direction of a body having a rotary axis, the apparatus comprising:
at least three sensors arranged offset around the rotary axis of the body, the at least three sensors including a first sensor generating a first sensor signal, a second sensor generating a second sensor signal, and a third sensor generating a third sensor signal; and
an evaluation unit for outputting a rotational direction signal indicating the rotational direction of the body, which is determined based on at least two of the first, second and third sensor signals, the evaluation unit comprising:
    a first evaluation circuit having at least three signal inputs for receiving the first, second and third sensor signals, the first evaluation circuit outputting a rotational direction signal based on comparing the first sensor signal to the second sensor signal when the second sensor is functional, the first evaluation circuit outputting a rotational direction signal based on comparing the first sensor signal to the third sensor signal in the event of a failure of the second sensor, the first evaluation circuit comprising:
        a first error detection circuit that generates an error signal when a number of flanks of the second sensor signal detected during one rotational period of the first sensor signal is not equal to one;
        a second error detection circuit that generates an error signal when a number of flanks of the third sensor signal detected during one rotational period of the first sensor signal is not equal to one;
        a first rotational direction detection circuit that generates a rotational direction signal based on comparing the first sensor signal to the second sensor signal;
        a second rotational direction detection circuit that generates a rotational direction signal based on comparing the first sensor signal to the third sensor signal; and
        first evaluation logic that
            outputs the rotational direction signal from the first rotational direction detection circuit when no error signal is generated by the first error detection circuit, and
            outputs the rotational direction signal from the second rotational direction detection circuit when an error signal is generated by the first error detection circuit and no error signal is generated by the second error detection circuit, and outputs an error signal when both the first and second error detection circuits generate error signals.

18. The apparatus of claim 17 further comprising:

a first memory that receives the rotational direction signals from the first and second rotational direction detection circuits and the error signals from the first and second error detection circuits for a last rotational period and for a next-to-last rotational period; and after the last rotational period, the first evaluation logic outputs the rotational direction signal that was stored in the first memory during the next-to-last rotational period and that was generated by the first or second rotational direction detection circuit based on non-erroneous sensor signals.

* * * * *